United States Patent
Yoon

(10) Patent No.: US 8,932,742 B2
(45) Date of Patent: Jan. 13, 2015

(54) BATTERY PACK AND HEATSINK FRAME INCLUDING HEATSINK WALLS AND HEATSINK FINS

(75) Inventor: Jihyoung Yoon, Suwon-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 588 days.

(21) Appl. No.: 12/805,033

(22) Filed: Jul. 8, 2010

(65) Prior Publication Data
US 2011/0117410 A1    May 19, 2011

(30) Foreign Application Priority Data
Nov. 19, 2009  (KR) .................. 10-2009-0111859

(51) Int. Cl.
*H01M 10/50*     (2006.01)
*F28F 7/00*      (2006.01)
*H01M 2/10*      (2006.01)
*F28D 15/02*     (2006.01)
*H01M 10/613*    (2014.01)
*H01M 10/625*    (2014.01)
*H01M 10/647*    (2014.01)
*H01M 10/6551*   (2014.01)
*H01M 10/6554*   (2014.01)
*H01M 10/6555*   (2014.01)
*F28F 1/12*      (2006.01)
(Continued)

(52) U.S. Cl.
CPC ......... *H01M 2/1077* (2013.01); *F28D 15/0275* (2013.01); *H01M 10/5004* (2013.01); *H01M 10/5016* (2013.01); *H01M 10/5032* (2013.01); *H01M 10/5046* (2013.01); *H01M 10/5053* (2013.01); *H01M 10/5055* (2013.01); *F28F 1/126* (2013.01); *F28F 1/32* (2013.01); *H01M 10/5048* (2013.01)
USPC .......................................... 429/120; 165/185

(58) Field of Classification Search
USPC .......................................... 429/120; 165/185
See application file for complete search history.

(56) References Cited

U.S. PATENT DOCUMENTS

2001/0019255 A1   9/2001  Park
2006/0049799 A1   3/2006  Hamada et al.
2006/0216582 A1*  9/2006  Lee et al. ................ 429/120
(Continued)

FOREIGN PATENT DOCUMENTS

JP    08-111244 A      4/1996
JP    2002184374 A  *  6/2002
(Continued)

OTHER PUBLICATIONS

Oka et al., Machine translation of JP 2002-184374 A, Jun. 2002.*
Korean Office Action in KR 10 2009-0111859, dated Jun. 30, 2011 (Yoon).
Korean Notice of Allowance in KR 10-2009-0111859, dated Dec. 30, 2011 (Yoon).

*Primary Examiner* — Sean P Cullen
(74) *Attorney, Agent, or Firm* — Lee & Morse, P.C.

(57) ABSTRACT

A battery pack and a heatsink frame, the battery pack including a heatsink member; a plurality of battery cells; the battery cells being disposed in the heatsink member; and a fixing member, the fixing member fixing the battery cells to the heatsink member, wherein the heatsink member includes a heatsink plate having a first surface and a second surface opposite to the first surface, a plurality of heatsink walls disposed on the first surface of the heatsink plate, and a plurality of heatsink fins disposed on the second surface of the heatsink plate.

17 Claims, 9 Drawing Sheets

(51) Int. Cl.
*F28F 1/32* (2006.01)
*H01M 10/6552* (2014.01)

(56) References Cited

U.S. PATENT DOCUMENTS

| | | | |
|---|---|---|---|
| 2007/0178369 A1* | 8/2007 | Conrardy et al. | 429/100 |
| 2008/0268313 A1* | 10/2008 | Hirayama | 429/26 |
| 2008/0299453 A1* | 12/2008 | Shinyashiki et al. | 429/152 |
| 2009/0142628 A1 | 6/2009 | Okada et al. | |
| 2009/0226800 A1* | 9/2009 | Ueshima et al. | 429/120 |

FOREIGN PATENT DOCUMENTS

| | | |
|---|---|---|
| JP | 2006-073461 A | 3/2006 |
| JP | 2006-107887 A | 4/2006 |
| JP | 2009-134938 A | 6/2009 |
| KR | 10 2001-0059433 A | 7/2001 |
| KR | 10 2006-0102855 A | 9/2006 |

\* cited by examiner

BATTERY PACK AND HEATSINK FRAME INCLUDING HEATSINK WALLS AND HEATSINK FINS

BACKGROUND

1. Field

Embodiments relate to a battery pack and a heatsink frame.

2. Description of the Related Art

Secondary batteries are batteries which are chargeable and dischargeable and thus are repeatedly usable. Secondary batteries including a single battery cell may be used as power sources for portable small electronic devices, e.g., portable terminals, notebooks, computers, cameras, and camcorders. A battery pack in which a plurality of battery cells are connected to each other may be used as, e.g., power sources for driving motors of hybrid electric vehicles (HEVs) and electric vehicles (EVs).

Since several tens to several hundreds of battery cells may be connected to each other to form one battery pack, the battery pack may include a cooling structure, a safety unit, and a system circuit, which may be configured to easily dissipate heat generated from each of the battery cells.

In particular, high-output large-capacity battery packs for HEVs and EVs may require improved heat dissipation characteristics to prevent swelling of battery cells while maintaining a minimized, compact size.

SUMMARY

Embodiments are directed to a battery pack and a heatsink frame, which represents advances over the related art.

It is a feature of an embodiment to provide a battery pack that may improve performance and life span of a battery cell.

It is another feature of an embodiment to provide a heatsink frame in which a battery cell may be easily inserted.

At least one of the above and other features and advantages may be realized by providing a battery pack including a heatsink member; a plurality of battery cells; the battery cells being disposed in the heatsink member; and a fixing member, the fixing member fixing the battery cells to the heatsink member, wherein the heatsink member includes a heatsink plate having a first surface and a second surface opposite to the first surface, a plurality of heatsink walls disposed on the first surface of the heatsink plate, and a plurality of heatsink fins disposed on the second surface of the heatsink plate.

Each of the heatsink walls may have a thickness, the thickness gradually decreasing toward an end of the heatsink walls.

Each of the heatsink walls may have a first flat surface and a second flat surface opposite to the first surface, an angle between the first surface of the heatsink plate and the first flat surface of the heatsink wall may be greater than about 90°, and an angle between the first surface of the heatsink plate and the second flat surface of the heatsink wall may be greater than about 90°.

Each of the heatsink walls may have a first flat surface and a second flat surface opposite to the first surface, an angle between the first surface of the heatsink plate and the first flat surface of the heatsink wall may be a right angle, and an angle between the first surface of the heatsink plate and the second flat surface of the heatsink wall may be greater than about 90°.

Each of the heatsink walls may have a first flat surface and a second flat surface opposite to the first surface, an angle between the first surface of the heatsink plate and the first flat surface of the heatsink wall may be greater than about 90°, and an angle between the first surface of the heatsink plate and the second flat surface of the heatsink wall may be a right angle.

The battery cells may be disposed between the heatsink walls.

The fixing member may include a spacer, the spacer being disposed between the heatsink walls; a bolt, the bolt passing through the heatsink walls and the spacer; and a nut, the nut being configured to tighten the bolt.

The spacer may have a thickness less than or equal to a thickness of each battery cell.

The heatsink member may further include a heat pipe, the heat pipe perpendicularly passing through the heatsink fins.

The battery pack may further include an insulation layer on the heatsink walls.

At least one of the above and other features and advantages may also be realized by providing a battery pack including a first heatsink member; a plurality of battery cells; the battery cells being disposed in the first heatsink member; a second heatsink member coupled to the first heatsink member, the second heatsink member having the same configuration as the first heatsink member; and a fixing member, the fixing member fixing the battery cells to the first heatsink member and the second heatsink member.

The first heatsink member and the second heatsink member may each include a heatsink plate having a first surface and a second surface opposite to the first surface, a plurality of heatsink walls disposed on the first surface of the heatsink plate, and a plurality of heatsink fins disposed on the second surface of the heatsink plate.

Each of the heatsink walls may have a thickness, the thickness gradually decreasing toward an end of the heatsink walls.

Each of the heatsink walls may have a vertical surface perpendicular to the heatsink plate and an inclined surface inclined at an inclined angle relative to the heatsink plate, and the inclined angle may be greater than about 90°.

The first heatsink member may be coupled to the second heatsink member such that inclined surfaces of respective heatsink walls face each other.

The heatsink member may further include a heat pipe perpendicularly passing through the heatsink fins.

The fixing member may include a bolt passing through the first heatsink member and the second heatsink member and a nut configured to tighten the bolt, and wherein the bolt may pass through the heatsink plate of the first heatsink member and the heatsink plate of the second heatsink member.

The fixing member may include a bolt passing through the first heatsink member and the second heatsink member and a nut configured to tighten the bolt, and wherein the bolt may pass through the heatsink walls of the first heatsink member and the heatsink walls of the second heatsink member.

At least one of the above and other features and advantages may also be realized by providing a heatsink frame including a heatsink plate having a first surface and a second surface opposite to the first surface; a plurality of heatsink walls disposed on the first surface of the heatsink plate, the heatsink walls being configured to accommodate a battery cell therebetween; and a plurality of heatsink fins disposed on the second surface of the heatsink plate.

At least one of the above and other features and advantages may also be realized by providing a heatsink frame including a first heatsink sub-frame and a second heatsink sub-frame, the first heatsink sub-frame and the second heatsink sub-frame each including a heatsink plate having a first surface and a second surface opposite to the first surface, a plurality of heatsink sub-walls disposed on the first surface of the heatsink plate, and a plurality of heatsink fins disposed on the second surface of the heatsink plate, wherein the first heatsink sub-frame is configured to interengage with the second heatsink sub-frame such that corresponding heatsink sub-walls of interengaged first and second heatsink sub-frames form heatsink walls configured to accommodate a battery cell therebetween.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1A:
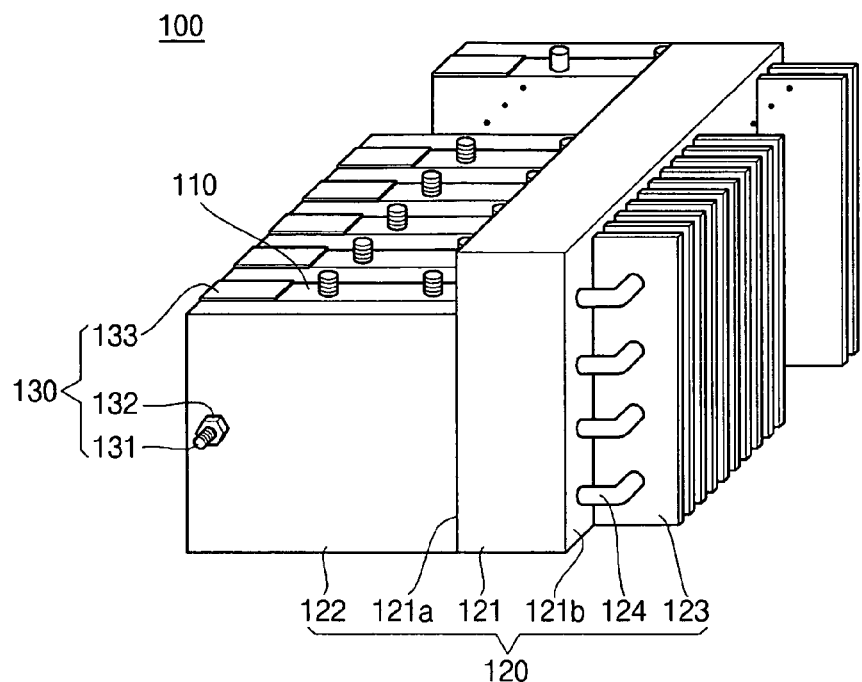
FIGS. 1A and 1B respectively illustrate a perspective view and a plan view of a battery pack according to an embodiment.

Korean Patent Application No. 10-2009-0111859, filed on Nov. 19, 2009, in the Korean Intellectual Property Office, and entitled: "Battery Pack," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

Figure 1B:
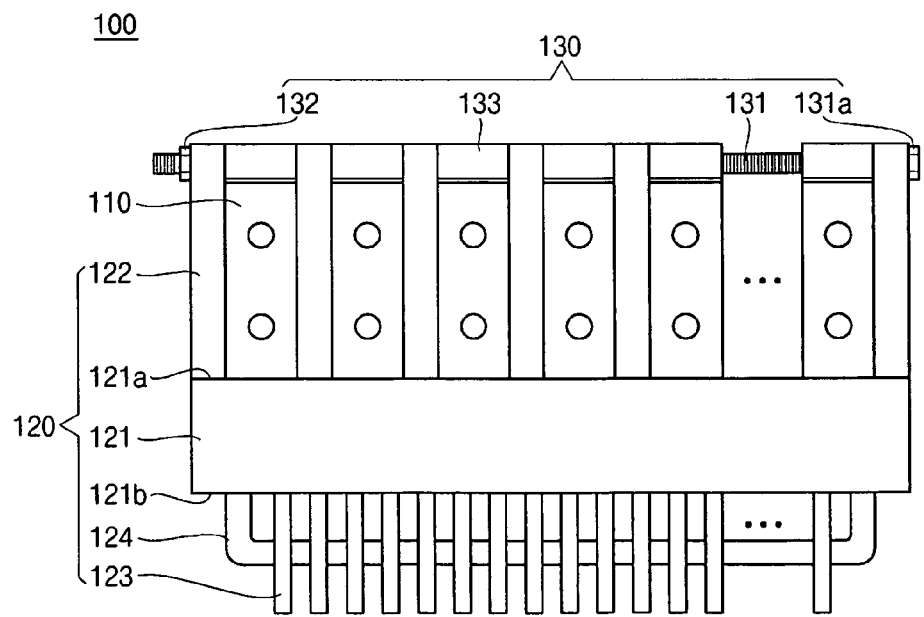
Figure 2:
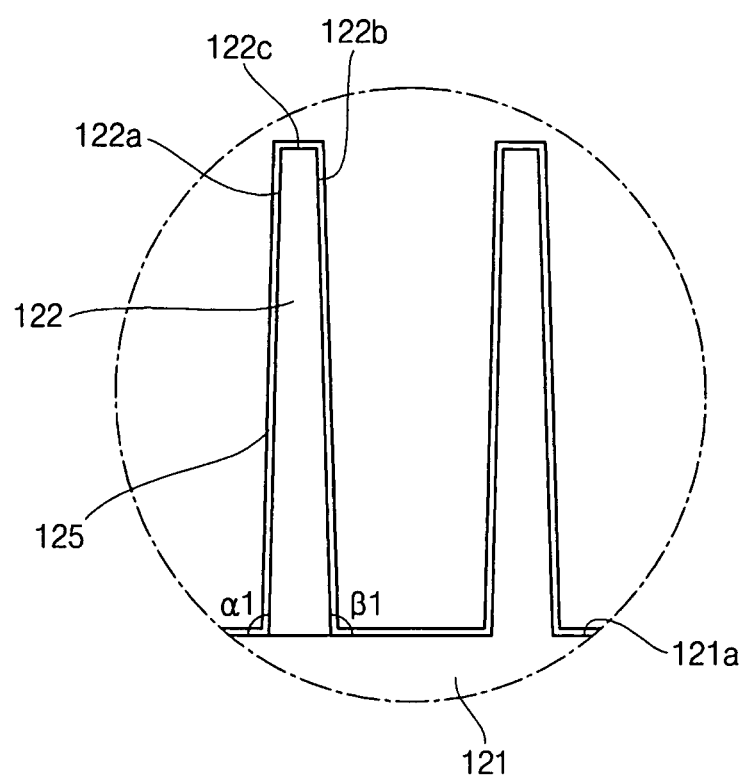
FIG. 2 illustrates an enlarged view of an example of a heatsink wall of FIG. 1B.

FIGS. 1A and 1B respectively illustrate a perspective view and a plan view of a battery pack according to an embodiment. FIG. 2 illustrates an enlarged view of an example of a heatsink wall of FIG. 1B.

Referring to FIGS. 1A and 1B, a battery pack 100 according to an embodiment may include a plurality of battery cells 110, a heatsink member 120 in which the battery cells 110 may be inserted, and a fixing member 130 configured to fix the battery cells 110 and the heatsink member 120.

The battery cells 110 may include an electrode assembly, a case, a cap assembly, a positive terminal, and a negative terminal. The electrode assembly may include a positive electrode plate and a negative electrode plate with an insulating separator therebetween. The case may provide a space in which the electrode assembly is disposed. The cap assembly may be coupled to the case to seal the case. The positive terminal and the negative terminal may protrude from the cap assembly and may be electrically connected to the positive electrode plate and the negative electrode plate of the electrode assembly, respectively. The battery cell 110 may be inserted into, i.e., accommodated in, the heatsink member 120. Although the positive terminal and the negative terminal of the battery cell 110 are illustrated as protruding upwardly in the drawings, in an implementation, the positive terminal and the negative terminal may protrude, e.g., laterally or downwardly. The plurality of battery cells 110 may be connected to each other and thus may be utilized as motor driving power sources for HEVs and EVs.

The heatsink member 120 may include, e.g., a heatsink plate 121, a plurality of heatsink walls 122, and a plurality of heatsink fins 123. The heatsink plate 121 may have a first flat surface 121a and a second flat surface 121b opposite to the first surface 121a. The plurality of heatsink walls 122 may be disposed on the first surface 121a of the heatsink plate 121. The plurality of heatsink fins 123 may be disposed on the second surface 121b of the heatsink plate 121. In addition, the heatsink member 120 may further include a heat pipe 124 perpendicularly passing through the heatsink fins 123. The heatsink member 120 may cool the battery cells 110. The heatsink plate 121, the heatsink walls 122, and the heatsink fins 123 may be integrated to form the heatsink member 120.

The heatsink plate 121 may include the first flat surface 121a and the second flat surface 121b opposite to the first surface 121a. The heatsink plate 121 may absorb heat generated from the battery cells 110. The heatsink plate 121 may be formed of, e.g., aluminum having a high thermal conductivity, but is not limited thereto.

The heatsink walls 122 may be disposed on the first surface 121a of the heatsink plate 121. The plurality of heatsink walls 122 may be spaced apart at a predetermined distance from each other. The battery cells 110 may be inserted between the heatsink walls 122. Specifically, in an implementation, each battery cell 110 may be inserted between adjacent heatsink walls 122. A distance between the adjacent heatsink walls 122 may be greater than a thickness of the respective battery cells 110. The heatsink walls 122 may absorb heat generated from the battery cells 110 and may prevent the battery cells 110 from swelling. The heatsink walls 122 and the heatsink plate 121 may be formed of the same material. In an implementation, the heatsink walls 122 may be integrated with the heatsink plate 121.

Referring to FIG. 2, each heatsink wall 122 may have a first flat surface 122a and a second flat surface 122b opposite to the first surface 122a. An angle $\alpha 1$ between the first surface 121a of the heatsink plate 121 and the first surface 122a of the heatsink wall 122 may be greater than about 90°. In addition, an angle $\beta 1$ between the first surface 121a of the heatsink plate 121 and the second surface 122b of the heatsink wall 122 may be greater than about 90°. Thus, a thickness between the first surface 122a and the second surface 122b of the heatsink wall 122 may gradually decrease from the first surface 121a of the heatsink plate 121 toward an end 122c of the heatsink wall 122. In other words, a thickness of the heatsink wall 122 adjacent to the first surface 121a of the heatsink plate 121 may be greater than a thickness of the heatsink wall 122 at the end 122c thereof.

Thus, since the angle α1 between the first surface 121a of the heatsink plate 121 and the first surface 122a of the heatsink wall 122 and the angle β1 between the first surface 121a of the heatsink plate 121 and the second surface 122b of the heatsink wall 122 may be greater than about 90°, a thickness between the first surface 122a and the second surface 122b of the heatsink wall 122 may gradually decrease from the first surface 121a of the heatsink plate 121 toward the end 122c of the heatsink wall 122. As a result, since a space between the heatsink walls 122 may gradually widen from an inside portion, i.e., adjacent to the heatsink plate 121, toward an inlet side, i.e., adjacent to the end 122c, the battery cells 110 may be easily inserted therein.

In addition, an insulation layer 125 may be disposed on the heatsink wall 122 to insulate the battery cell 110 from the heatsink wall 122. The insulation layer 125 may be formed by, e.g., performing an anodizing process on the heatsink wall 122 or attaching an insulation pad to the heatsink wall 122. In an implementation, an aluminum anodizing process may be used as the anodizing process. In the anodizing process, an aluminum article may be immersed in an electrolyte, and then, when current is applied to an anode, a surface of the aluminum article may be oxidized by oxygen generated from the anode to form an aluminum oxide film. The aluminum oxide film may have, e.g., superior corrosion resistance, wear resistance, and electrical insulation.

The heatsink fins 123 may be disposed on the second surface 121b of the heatsink plate 121. The heatsink fins 123 may dissipate heat generated from the battery cell 110. A plurality of heatsink fins 123 may be provided, and the plurality of heatsink fins 123 may be spaced apart from each other at a predetermined distance. Thus, heat dissipation efficiency per unit area may be improved. The heatsink fins 123 and the heatsink plate 121 may be formed of the same material. In an implementation, the heatsink fins 123 may be integrated with the heatsink plate 121.

The heat pipe 124 may perpendicularly pass through the heatsink fin 123. A plurality of heat pipes 124 may be provided. An interior of the heat pipe 124 may be hollow. The heat pipe 124 may have, e.g., a circular bar shape in cross-section. An evaporative material, e.g., distilled water or liquid nitrogen, which is evaporable by heat, may fill the heat pipe 124, but is not limited thereto.

When the heatsink plate 121 absorbs heat generated from the battery cell 110, the evaporative material in the heat pipe 124 connected to the heatsink plate 121 may be evaporated by the absorbed heat. The evaporated material may move along the heat pipe 124 toward the heatsink fin 123 having a temperature lower than that of the heatsink plate 121. The evaporated material may condense due to, e.g., the lower temperature of the heatsink fin 123. Then, the condensed, i.e., liquefied, evaporative material may return to the heatsink plate 121 along the heat pipe 124. The heatsink plate 121 may be cooled by the liquefied evaporative material, and therefore, the battery cells 110 may be cooled. That is, a convection phenomenon in which the evaporative material is circulated may immediately and repeatedly occur within the heat pipe 124 to dissipate heat generated from the battery cell 110.

The fixing member 130 may include at least one spacer 133 disposed between the heatsink walls 122, a bolt 131 passing through the heatsink walls 122 and the spacer 133, and a nut 132 for tightening the bolt 131.

A thread having a constant width may be disposed on the bolt 131 in a longitudinal direction. A head 131a may be disposed at an end of the thread. The bolt 131 may pass through the heatsink wall 122 and the spacer 133 and may be tightened by the nut 132. A through-hole (not illustrated) may be defined in the heatsink wall 122 and the spacer 133, and thus the bolt 131 may pass through the through-hole. The head 131a may have a diameter greater than a diameter of the through-hole defined in the heatsink wall 122 and the spacer 133.

A thread corresponding to that of the bolt 131 may be disposed inside of the nut 132 to couple the bolt 131 to the nut 132. The nut 132 may have a diameter greater than a diameter of the through-hole defined in the heatsink wall 122 and the spacer 133.

The spacer 133 may be disposed between adjacent heatsink walls 122. After the battery cell 110 is disposed between the heatsink walls 122, the spacer 133 may be disposed in a space adjacent to the battery cell 110 and between adjacent heatsink walls 122. To fix the battery cell 110 to the heatsink member 120, the spacer 133 may have a thickness less than or equal to a thickness of the battery cell 110.

The battery cell 110 may be fixed to the heatsink member 120 using the fixing member 130 according to the above-described configuration by the following method. When the battery cell 110 is inserted between the heatsink walls 122, the spacer 133 may be disposed in a space adjacent to the battery cell 110 and between adjacent heatsink walls 122. Then, the bolt 131 may pass through the through-hole defined in the heatsink wall 122 and the spacer 133 and then may be tightened by the nut 132. Thus, the battery cell 110 may be fixed to the heatsink member 120.

As described above, the battery pack 100 according to an embodiment may quickly dissipate the heat generated from the battery cell 110 through the heatsink member 120 including the heatsink plate 121, the heatsink wall 122, the heatsink fins 123, and the heat pipe 124. Therefore, performance and life span of the battery cell 110 may be improved.

Also, in the battery pack 100 according to an embodiment, the battery cell 110 may be fixed between the heatsink walls 122 to prevent swelling and deterioration of the battery cell 110. Therefore, in the battery pack 100 of an embodiment, performance and life span of the battery cell 110 may be improved.

Also, in the battery pack 100 according to an embodiment, since the heatsink wall 122 may be tapered toward an end thereof, the battery cell 110 may be easily inserted between adjacent heatsink walls 122.

Figure 3:
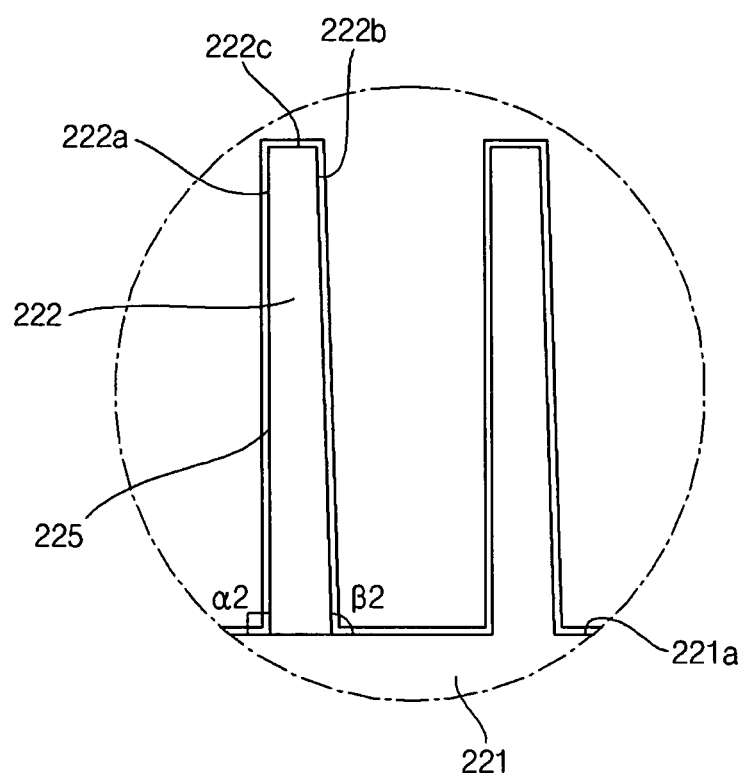
FIG. 3 illustrates an enlarged view of another example of the heatsink wall of FIG. 1B.

FIG. 3 illustrates an enlarged view of another example of the heatsink wall of FIG. 2.

The heatsink wall illustrated in FIG. 3 is similar to that of FIG. 2. Thus, only the different portions will be described herein.

Referring to FIG. 3, a heatsink wall 222 may have a first flat surface 222a and a second flat surface 222b opposite to the first surface 222a. An insulation layer 225 may be disposed on the heatsink wall 222. An angle α2 between a first surface 221a of a heatsink plate 221 and the first surface 222a of the heatsink wall 222 may be a right angle. An angle β2 between the first surface 221a of the heatsink plate 221 and the second surface 222b of the heatsink wall 222 may be greater than about 90°. That is, a thickness between the first surface 222a and the second surface 222b of the heatsink wall 222 may gradually decrease from the first surface 221a of the heatsink plate 221 toward an end 222c of the heatsink wall 222. In other words, a thickness of the heatsink wall 222 adjacent to the heatsink plate 221 may be greater than a thickness of the heatsink wall 222 at an end 222c thereof.

As described above, since the angle α2 between the first surface 221a of the heatsink plate 221 and the first surface 222a of the heatsink wall 222 may be a right angle and the angle β2 between the first surface 221a of the heatsink plate 221 and the second surface 222b of the heatsink wall 222 may be greater than about 90°, the thickness between the first surface 222a and the second surface 222b of the heatsink wall 222 may gradually decrease from the first surface 221a of the heatsink plate 221 toward the end 222c of the heatsink wall 222. As a result, since a space between the heatsink walls 222 may gradually widen from an inside portion, i.e., adjacent to the heatsink plate 221, toward an inlet side, i.e., adjacent to the end 222c, the battery cells 110 may be easily inserted therein.

Figure 4:
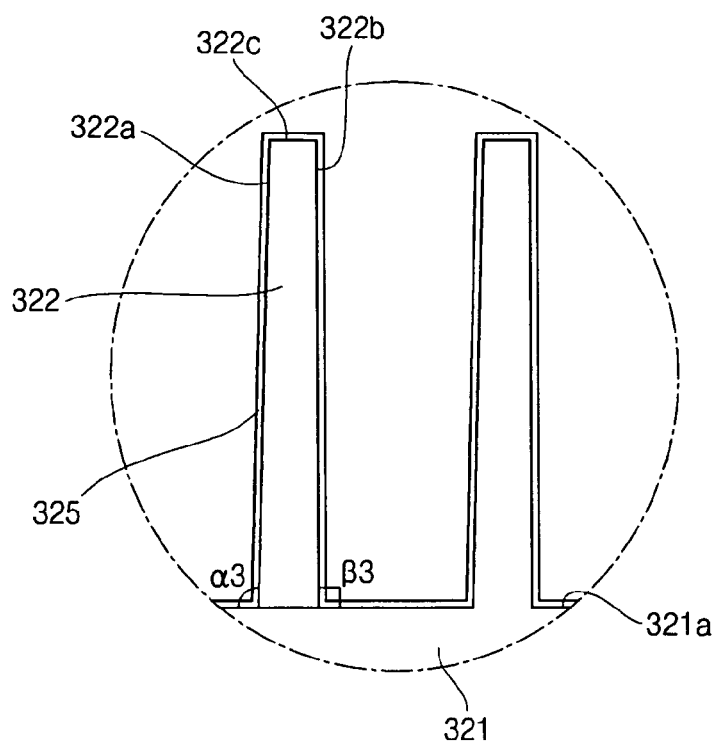
FIG. 4 illustrates an enlarged view of yet another example of the heatsink wall of FIG. 1B.

FIG. 4 illustrates an enlarged view of another example of the heat wall of FIG. 2. The heatsink wall illustrated in FIG. 4 is similar to that of FIG. 2. Thus, only the different portions will be described herein.

Referring to FIG. 4, a heatsink wall 322 may have a first flat surface 322a and a second flat surface 322b opposite to the first surface 322a. An insulation layer 325 may be disposed on the heatsink wall 322. An angle α3 between a first surface 321a of a heatsink plate 321 and the first surface 322a of the heatsink wall 322 may be greater than about 90°. An angle β3 between the first surface 321a of the heatsink plate 321 and the second surface 322b of the heatsink wall 322 may be a right angle. That is, a thickness between the first surface 322a and the second surface 322b of the heatsink wall 322 may gradually decrease from the first surface 321a of the heatsink plate 321 toward an end 322c of the heatsink wall 322.

As described above, since the angle α3 between the first surface 321a of the heatsink plate 321 and the first surface 322a of the heatsink wall 322 may be greater than about 90° and the angle β3 between the first surface 321a of the heatsink plate 321 and the second surface 322b of the heatsink wall 322 may be a right angle, the thickness between the first surface 322a and the second surface 322b of the heatsink wall 322 may gradually decrease from the first surface 321a of the heatsink plate 321 toward the end 322c of the heatsink wall 322. As a result, since a space between the heatsink walls 322 may gradually widen from an inside portion, i.e., adjacent to the heatsink plate 221, toward an inlet side, i.e., adjacent to the end 322c, the battery cells 110 may be easily inserted therein.

An embodiment may also provide a heatsink frame. The heatsink frame may include a heatsink plate, a plurality of heatsink walls, and a plurality of heatsink fins. The heatsink plate may have a first surface and a second surface opposite to the first surface. The heatsink walls may be disposed on the first surface and may be configured to accommodate a battery cell therebetween. The heatsink fins may be disposed on the second surface of the heatsink plate.

Figure 5A:
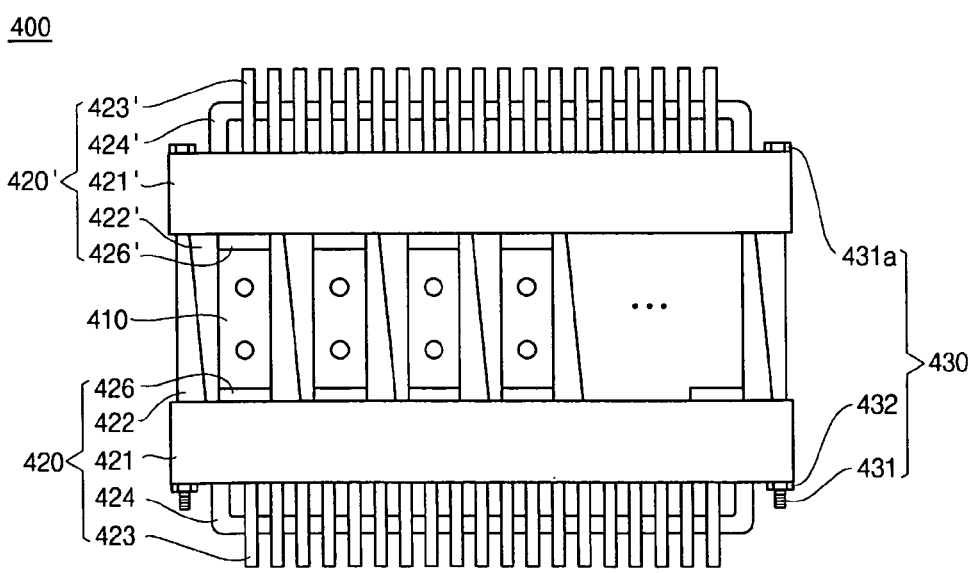
FIG. 5A illustrates a plan view of a battery pack according to another embodiment.
Figure 5B:
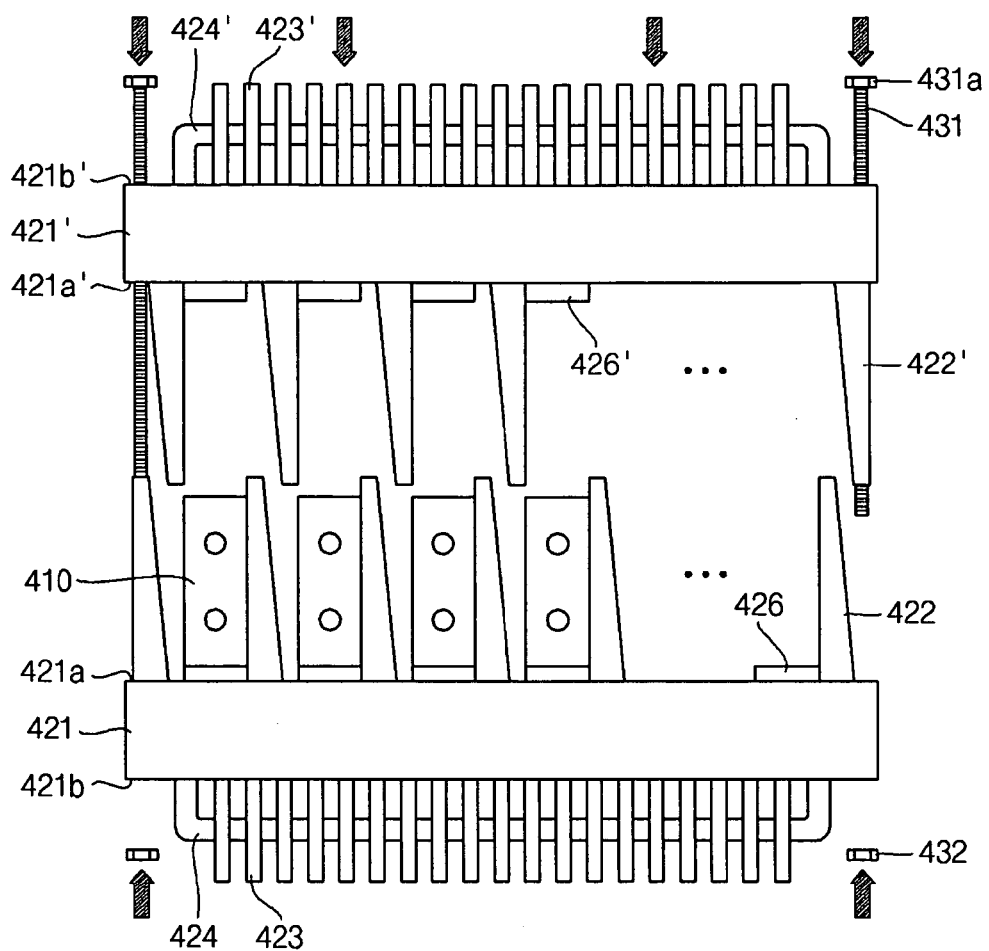
FIG. 5B illustrates an exploded view of the battery pack of FIG. 5A.
Figure 6:
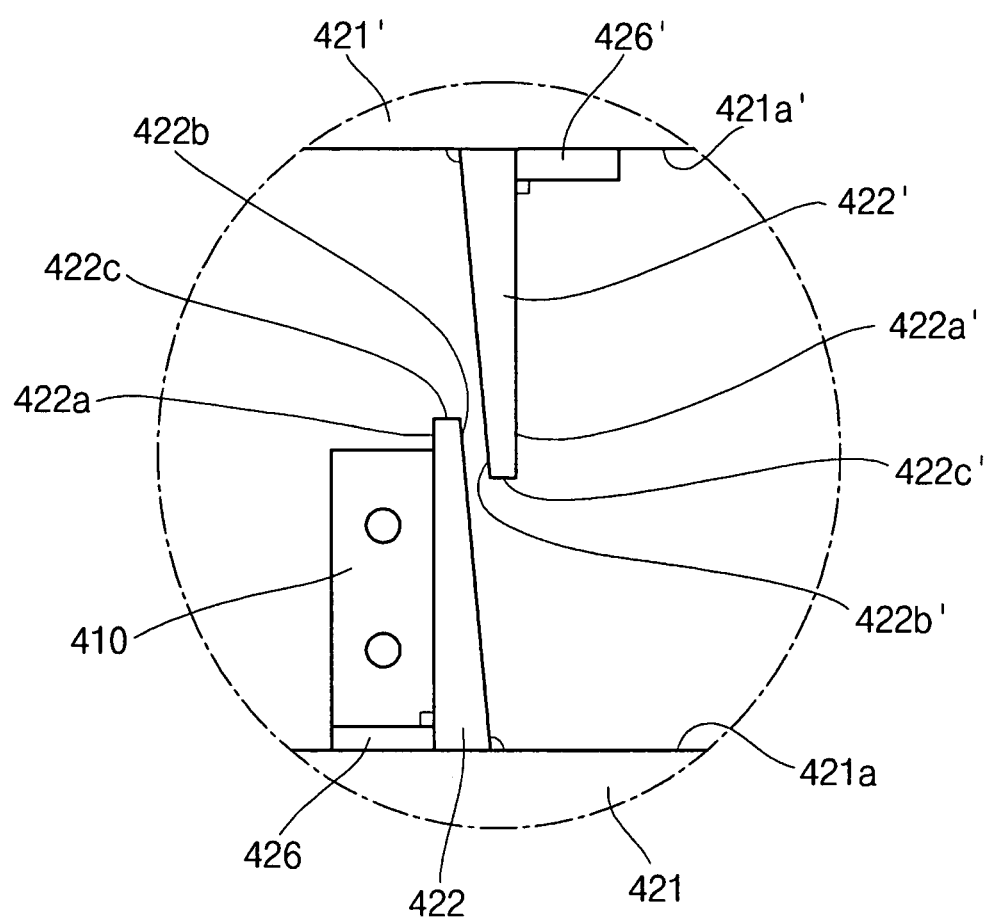
FIG. 6 illustrates an enlarged view of a heatsink wall of FIG. 5B.

FIG. 5A illustrates a plan view of a battery pack according to another embodiment. FIG. 5B illustrates an exploded view of the battery pack of FIG. 5A. FIG. 6 illustrates an enlarged view of a heat wall of FIG. 5B. The battery pack 400 illustrated in FIGS. 5A and 5B is similar to that 100 of FIGS. 1A and 1B. Thus, only the different portions will be described herein.

Referring to FIGS. 5A and 5B, the battery pack 400 according to the present embodiment may include a plurality of battery cells 410, a first heatsink member 420 in which the battery cells 410 are inserted, a second heatsink member 420' coupled to the first heatsink member 420 and having the same configuration as the first heatsink member 420, and a fixing member 430 configured to fix the battery cells 410, the first heatsink member 420, and the second heatsink member 420'.

The first heatsink member 420 may include a heatsink plate 421, a plurality of heatsink walls 422, a plurality of heatsink fins 423, and a heat pipe 424. The heatsink plate 421 may have a first flat surface 421a and a second flat surface 421b opposite to the first surface 421a. The plurality of heatsink walls 422 may be disposed on the first surface 421a of the heatsink plate 421. The plurality of heatsink fins 423 may be disposed on the second surface 421b of the heatsink plate 421. The heat pipe 424 may perpendicularly pass through the heatsink fins 423. The first heatsink member 420 may further include auxiliary protrusions 426 disposed on a portion thereof between the battery cells 410 and the first surface 421a of the heatsink plate 421. In an implementation, the first heatsink member 420 may cool the battery cells 410. The heatsink plate 421, the heatsink walls 422, and the heatsink fins 423 may be integrated to form the first heatsink member 420.

Since the second heat sink member 420' has the same configuration as the first heatsink member 420, the second heatsink member 420' may include a heatsink plate 421', a plurality of heatsink walls 422', a plurality of heatsink fins 423', and a heat pipe 424'. The heatsink plate 421' may have a first flat surface 421a' and a second flat surface 421b' opposite to the first surface 421a'. The plurality of heatsink walls 422' may be disposed on the first surface 421a' of the heatsink plate 421'. The plurality of heatsink fins 423' may be disposed on the second surface 421b' of the heatsink plate 421'. The heat pipe 424' may perpendicularly pass through the heatsink fins 423'. The second heatsink member 420' may further include auxiliary protrusions 426' disposed on a portion thereof between the battery cells 410 and the first surface 421a' of the heatsink plate 422'. In an implementation, the second heatsink member 420' may cool the battery cells 410. The heatsink plate 421', the heatsink walls 422', and the heatsink fins 423' may be integrated to form the second heatsink member 420'.

Referring to FIG. 6, each heatsink wall 422 may have a vertical surface 422a perpendicular to the first surface 421a of the heatsink plate 421 and an inclined surface 422b opposite to the vertical surface 422a and inclined relative to the first surface 421a of the heatsink plate 421. An angle between the first surface 421a of the heatsink plate 421 and the inclined surface 422b of the heatsink wall 422 may be greater than about 90°. That is, a thickness between the vertical surface 422a and the inclined surface 422b of the heatsink wall 422 may gradually decrease from the first surface 421a of the heatsink plate 421 toward an end 422c of the heatsink wall 422. In other words, a thickness between the vertical surface 422a and the inclined surface 422b adjacent to the first surface 421a may be greater than a thickness between the vertical surface 422a and the inclined surface 422b adjacent to the end 422c. The auxiliary protrusions 426 may be disposed on the first surface 421a of the heatsink plate 421 and between adjacent heatsink walls 422, in a space adjacent to which a battery cell 410 may be inserted. The auxiliary protrusions 426 may be integrated with the heatsink plate 421 and the heatsink wall 422.

Since the second heatsink member 420' may have the same configuration as the first heatsink member 420, repeated description thereof will be omitted. In this regard, the second heatsink member 420' may similarly have a vertical surface 422a', an inclined surface 422b', and an end 422c'.

The fixing member 430 may include a bolt 431 passing through the first heatsink member 420 and the second heatsink member 420' as well as a nut 432 for tightening the bolt 431. The fixing member 430 may fix both ends of the first heatsink member 420 and the second heatsink member 420' after the first heatsink member 420 and the second heatsink member 420' are coupled to each other. In an implementation, the fixing member 430 may include a plurality of bolts 431, nuts 432, and through-holes.

A thread having a constant width may be disposed on the bolt 431 in a longitudinal direction. A head 431a may be disposed at an end of the thread. The bolt 431 may pass through the heatsink plate 421 of the first heatsink member 420 and a heatsink plate 421' of the second heatsink member 420' and may be tightened by the nut 432. Also, the bolt 431 may pass through the heatsink wall 422 of the first heatsink member 420 or a heatsink wall 422' of the second heatsink member 420'. A through-hole may be defined in the heatsink plate 421 of the first heatsink member 420 and the heatsink plate 421' of the second heatsink member 420', and thus the bolt 431 may pass through the through-hole. The head 431a may have a diameter greater than a diameter of the through-hole defined in the heatsink plate 421 of the first heatsink member 420 and the heatsink plate 421' of the second heatsink member 420'.

A thread corresponding to that of the bolt 431 may be disposed inside of the nut 432 to couple the bolt 431 to the nut 432. The nut 432 may have a diameter greater than a diameter of the through-hole defined in the heatsink plate 421 of the first heatsink member 420 and the heatsink plate 421' of the second heatsink member 420'.

A process for fixing the battery cell 410 to the first heatsink member 420 and the second heatsink member 420' using the fixing member 430 according to the above-described configuration may be explained as follows. When the battery cell 410 is inserted between the heatsink walls 422 of the first heatsink member 420, the second heatsink member 420' may be coupled to the first heatsink member 420. At this time, the inclined surface 422b of the first heatsink member 420 may be facingly coupled to an inclined surface 422b' of the corresponding second heatsink member 420'. Then, the bolt 431 may pass through the through-hole defined in the heatsink plate 421 of the first heatsink member 420 and the heatsink plate 421' of the second heatsink member 420' and may be tightened by the nut 432. Thus, the battery cell 410 may be fixed to the first heatsink member 420 and the second heatsink member 420'.

As described above, in the battery pack 400 according to the present embodiment, the battery cell 410 may be fixed between the first heatsink member 420 and the second heatsink member 420' to prevent swelling and deterioration of the battery cell 410. Therefore, in the battery pack 400 according to the present embodiment, performance and life span of the battery cell 410 may be improved.

Figure 7A:
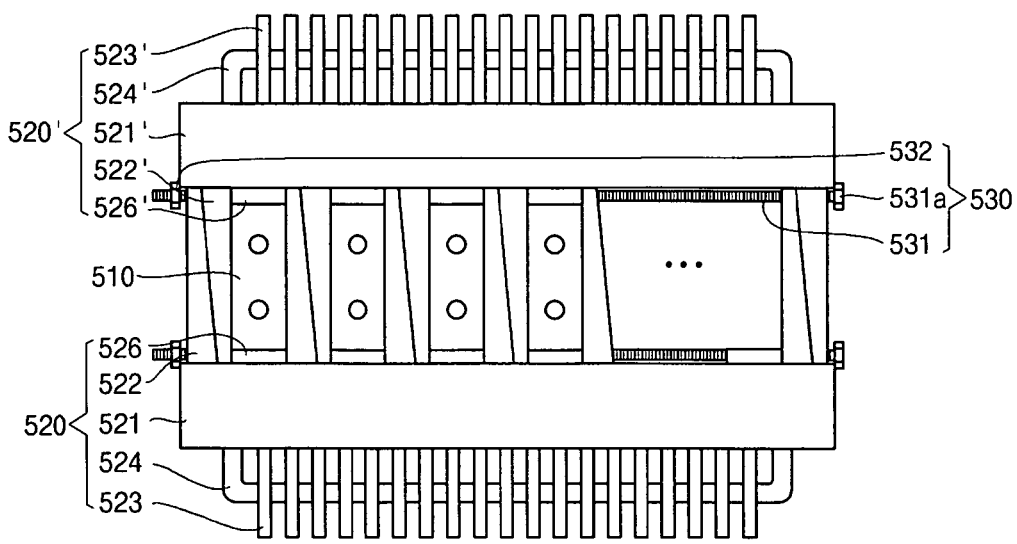
FIG. 7A illustrates a plan view of a battery pack according to another embodiment.
Figure 7B:
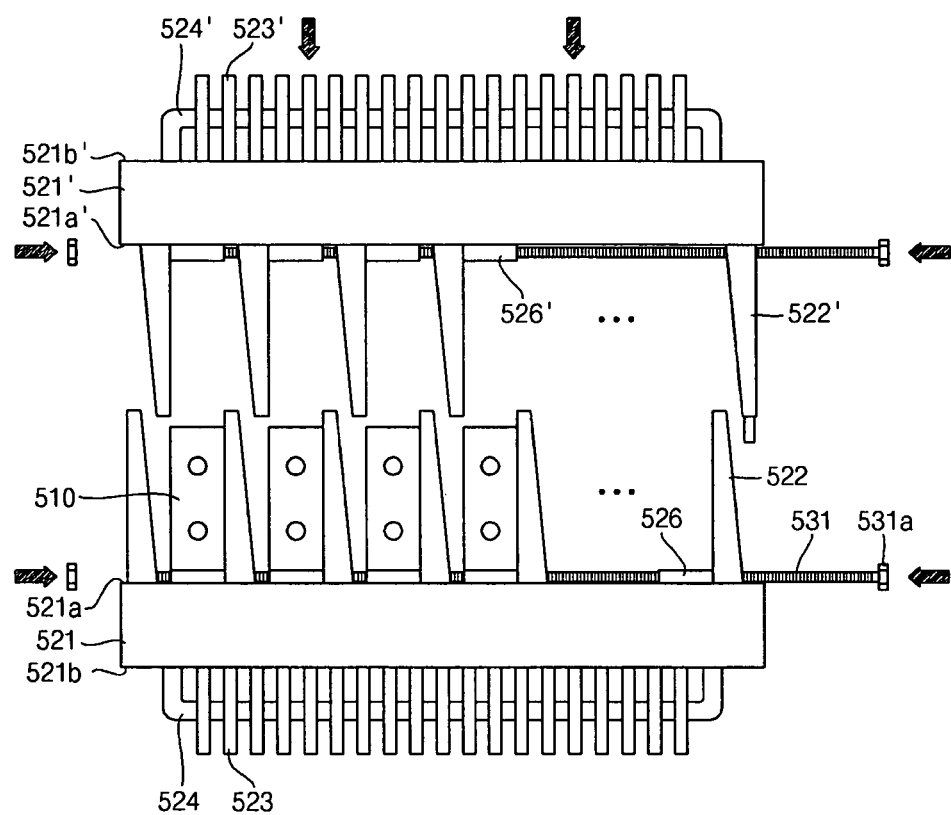
FIG. 7B illustrates an exploded view of the battery pack of FIG. 7A.
Figure 8:
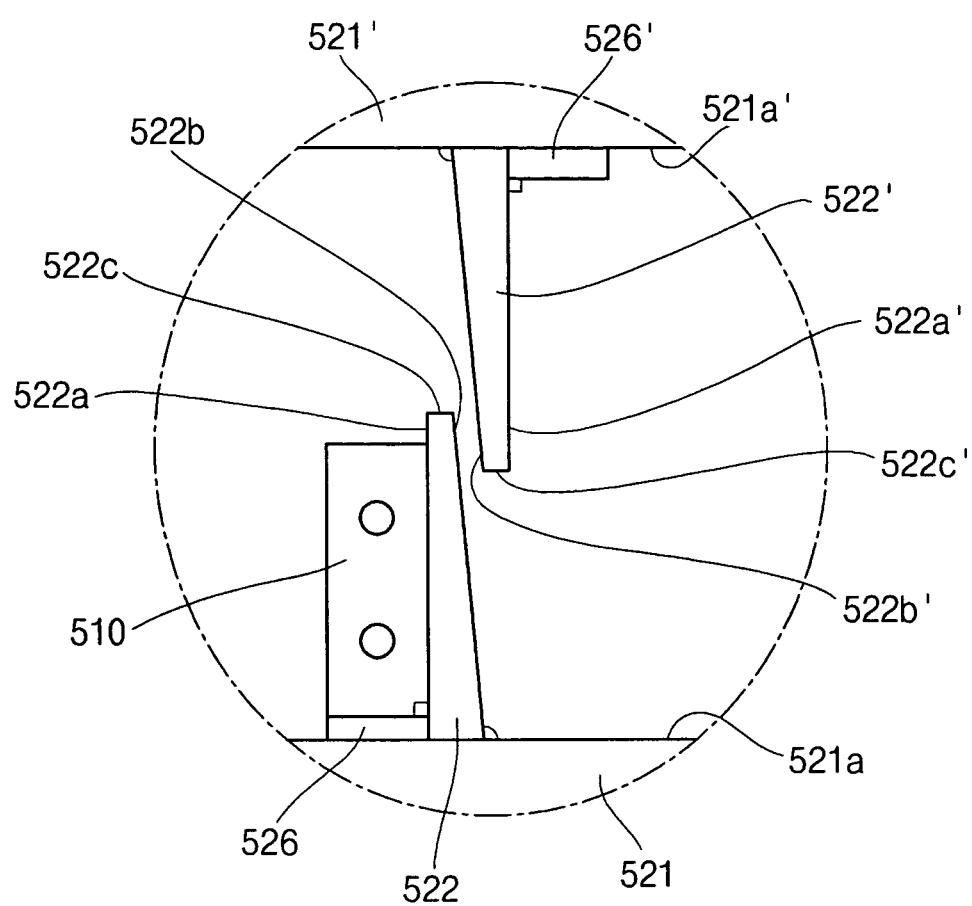
FIG. 8 illustrates an enlarged view of a heatsink wall of FIG. 7B.

FIG. 7A illustrates a plan view of a battery pack according to still another embodiment. FIG. 7B illustrates an exploded view of the battery pack of FIG. 7A. FIG. 8 illustrates an enlarged view of a heatsink wall of FIG. 7B. A battery pack 500 illustrated in FIGS. 7A and 7B may be similar to that 400 of FIGS. 5A and 5B. Thus, only the different portions will be described herein.

Since the battery pack 500 may be similar to battery pack 400, the battery pack 500 may include first and second heatsink members 520 and 520'. The first and second heatsink members 520 and 520' may respectively include a heatsink plate 521 and 521', a plurality of heatsink walls 522 and 522', a plurality of heatsink fins 523 and 523', and a heat pipe 524 and 524'. The heatsink plate 521 and 521' may respectively have a first flat surface 521a and 521a' and a second flat surface 521b and 521b' opposite to the first surface 521a and 521a'. Each heatsink wall 522 and 522' may respectively have a vertical surface 522a and 522a' perpendicular to the first surface 521a and 521a' of the heatsink plate 521 and 521'. Each heatsink wall 522 and 522' may respectively have an inclined surface 522b and 522b' opposite to the vertical surface 522a and 522a' and inclined relative to the first surface 521a and 521a' of the heatsink plate 521 and 521'. A thickness between the vertical surface 522a and 522a' may gradually decrease from the first surface 521a and 521a' of the heatsink plate 521 and 521' toward an end 522c and 522c' of the heatsink wall 522 and 522', respectively.

A fixing member 530 may include a bolt 531 passing through a first heatsink member 520 and a second heatsink member 520' as well as a nut 532 for tightening the bolt 531. The fixing member 530 may fix both ends of the first heatsink member 520 and the second heatsink member 520' after the first heatsink member 520 and the second heatsink member 520' are coupled to each other.

A thread having a constant width may be disposed on the bolt 531 in a longitudinal direction. A head 531a may be disposed at an end of the thread. The bolt 531 may pass through a heatsink wall 522 of the first heatsink member 520 and a heatsink wall 522' of the second heatsink member 520' and may be tightened by the nut 532. In an implementation, the bolt 531 may pass through the heatsink wall 522 of the first heatsink member 520, an auxiliary protrusion 526 of the first heatsink member 520, and the heatsink wall 522' of the second heatsink member 520' and may be tightened by the nut 532. In another implementation, the bolt 531 may pass through the heatsink wall 522' of the second heatsink member 520', an auxiliary protrusion 526' of the second heatsink member 520', and the heatsink wall 522 of the first heatsink member 520 and may be tightened by the nut 532. In an implementation, a through-hole may be defined in the heatsink wall 522 and the auxiliary protrusion 526 of the first heatsink member 520 and the heatsink wall 522' of the second heatsink member 520'. In another implementation, a through-hole may be defined in the heatsink wall 522' and the auxiliary protrusion 526' of the second heatsink member 520' and the heatsink wall 522 of the first heatsink member 520. Thus, the bolt 531 may pass through the through-hole. The head 531a may have a diameter greater than the diameter of the respective through-hole.

A thread corresponding to that of the bolt 531 may be disposed inside of the nut 532 to couple the bolt 531 to the nut 532. The nut 532 may have a diameter greater than a diameter of its corresponding through-hole defined.

A process for fixing the battery cell 510 to the first heatsink member 520 and the second heatsink member 520' using the fixing member 530 according to the above-described configuration may be explained as follows. When the battery cell 510 is inserted between the heatsink walls 522 of the first heatsink member 520, the second heatsink member 520' may be coupled to the first heatsink member 520. At this time, an inclined surface 522b of the first heatsink member 520 may be facingly coupled to an inclined surface 522b' of the corresponding second heatsink member 520'. Then, the bolt 531 may pass through a through-hole defined in the heatsink wall 522 and the auxiliary protrusion 526 of the first heatsink member 520 and the heatsink wall 522' of the second heatsink member 520'. The bolt 531 may be tightened by the nut 532. Thus, the battery cell 510 may be fixed between the first heatsink member 520 and the second heatsink member 520'. In an implementation, the first heatsink member 520 may be coupled to the second heatsink member 520' with two bolts 531 and respective ends thereof.

As described above, in the battery pack 500 according to the present embodiment, the battery cell 510 may be fixed between the first heatsink member 520 and the second heatsink member 520' to prevent swelling and deterioration of the battery cell 510. Therefore, in the battery pack 500 according to the present embodiment, performance and life span of the battery cell 510 may be improved.

Another embodiment may provide a heatsink frame. The heatsink frame may include a first heatsink sub-frame and a second heatsink sub-frame. The first heatsink sub-frame and the second heatsink sub-frame may each include a heatsink plate, a plurality of heatsink sub-walls, and a plurality of heatsink fins. The heatsink plate may have a first surface and a second surface opposite to the first surface. The heatsink sub-walls may be disposed on the first surface of the heatsink plate. The heatsink fins may be disposed on the second surface of the heatsink plate. The first heatsink sub-frame may be configured to interengage with the second heatsink sub-frame such that corresponding heatsink sub-walls of the interengaged first and second heatsink sub-frames may form heatsink walls. The heatsink walls may be configured to accommodate a battery cell therebetween.

The battery pack according to an embodiment may quickly dissipate heat generated from the battery cell to prevent swelling of the battery cell, thereby improving performance and life span of the battery cell.

Also, in the battery pack according to an embodiment, since the thickness of the heatsink wall may be gradually thinner toward the end thereof, the battery cell may be easily inserted.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A battery pack, comprising:
    a heatsink member;
    a plurality of battery cells; the battery cells being disposed in the heatsink member; and
    a fixing member, the fixing member fixing the battery cells to the heatsink member,
    wherein the heatsink member includes:
        a heatsink plate having a first surface and a second surface opposite to the first surface,
        a plurality of heatsink walls disposed on the first surface of the heatsink plate, each of the heatsink walls having a thickness that gradually decreases along an entirety from the first surface of the heatsink plate to an end of the heatsink walls, each of the battery cells being arranged between and contacting adjacent ones of the plurality of heatsink walls, and
        a plurality of heatsink fins disposed on the second surface of the heatsink plate.

2. The battery pack as claimed in claim 1, wherein:
    each of the heatsink walls has a first flat surface and a second flat surface opposite to the first flat surface,
    an angle between the first surface of the heatsink plate and the first flat surface of the heatsink wall is greater than about 90°, and
    an angle between the first surface of the heatsink plate and the second flat surface of the heatsink wall is greater than about 90°.

3. The battery pack as claimed in claim 1, wherein:
    each of the heatsink walls has a first flat surface and a second flat surface opposite to the first flat surface,
    an angle between the first surface of the heatsink plate and the first flat surface of the heatsink wall is a right angle, and
    an angle between the first surface of the heatsink plate and the second flat surface of the heatsink wall is greater than about 90°.

4. The battery pack as claimed in claim 1, wherein:
    each of the heatsink walls has a first flat surface and a second flat surface opposite to the first flat surface,
    an angle between the first surface of the heatsink plate and the first flat surface of the heatsink wall is greater than 90°, and
    an angle between the first surface of the heatsink plate and the second flat surface of the heatsink wall is a right angle.

5. The battery pack as claimed in claim 1, wherein the fixing member includes:
    a spacer, the spacer being disposed between the heatsink walls,
    a bolt, the bolt passing through the heatsink walls and the spacer, and
    a nut, the nut being configured to tighten the bolt.

6. The battery pack as claimed in claim 5, wherein the spacer has a thickness less than or equal to a thickness of each battery cell.

7. The battery pack as claimed in claim 1, wherein the heatsink member further includes a heat pipe, the heat pipe perpendicularly passing through the heatsink fins.

8. The battery pack as claimed in claim 1, wherein the heatsink walls comprise an insulation layer.

9. The battery pack as claimed in claim 1, wherein the battery cells contact the first surface of the heatsink plate.

10. A battery pack, comprising:
    a first heatsink member;
    a plurality of battery cells; the battery cells being disposed in and contacting the first heatsink member;
    a second heatsink member coupled to the first heatsink member, the second heatsink member having the same configuration as the first heatsink member; and
    a fixing member, the fixing member fixing the battery cells to the first heatsink member and the second heatsink member, wherein:
    the first heatsink member includes a first heatsink plate and a plurality of first heatsink walls protruding from a surface of the first heatsink plate, and the second heatsink member includes a second heatsink plate and a plurality of second heatsink walls protruding from a surface of the second heatsink plate,
    each of the first and second heatsink walls have a thickness that gradually decreases from the surface of the first and second heatsink plates, respectively, to an end of the first and second heatsink walls, respectively, and
    each of the battery cells is arranged between and contacts an adjacent one of the plurality of first heatsink walls and an adjacent one of the plurality of second heatsink walls.

11. The battery pack as claimed in claim 10, wherein the first heatsink member and the second heatsink member include a plurality of first heatsink fins and second heatsink fins disposed on other surfaces of the first and second heatsink plates, respectively.

12. The battery pack as claimed in claim 11, wherein:
    each of the first heatsink walls has a vertical surface perpendicular to the first heatsink plate and an inclined surface inclined at a first inclined angle relative to the first heatsink plate, and
    each of the second heatsink walls has a vertical surface perpendicular to the second heatsink plate and an inclined surface inclined at a second inclined angle relative to the second heatsink plate, wherein each of the first inclined angle and the second inclined angle is greater than about 90°.

13. The battery pack as claimed in claim 12, wherein the first heatsink member is coupled to the second heatsink member such that inclined surfaces of the first and second heatsink walls face each other.

14. The battery pack as claimed in claim 11, wherein the first heatsink member further includes a first heat pipe perpendicularly passing through the first heatsink fins, and the second heatsink member further includes a second heat pipe perpendicularly passing through the second heatsink fins.

15. The battery pack as claimed in claim 11, wherein the fixing member includes a bolt passing through the first heatsink member and the second heatsink member and a nut configured to tighten the bolt, and wherein the bolt passes through the first heatsink plate and the second heatsink plate.

16. The battery pack as claimed in claim 11, wherein the fixing member includes a bolt passing through the first heatsink member and the second heatsink member and a nut configured to tighten the bolt, and wherein the bolt passes through the first heatsink walls and the second heatsink walls.

17. A heatsink frame, comprising:
a first heatsink sub-frame and a second heatsink sub-frame, the first heatsink sub-frame and the second heatsink sub-frame each including:
a heatsink plate having a first surface and a second surface opposite to the first surface,
a plurality of heatsink sub-walls disposed on the first surface of the heatsink plate, a thickness of the heatsink sub-walls gradually decreases from the first surface of the heatsink plate to an end of the heatsink sub-walls, and
a plurality of heatsink fins disposed on the second surface of the heatsink plate,
wherein the first heatsink sub-frame is configured to interengage with the second heatsink sub-frame such that corresponding heatsink sub-walls of interengaged first and second heatsink sub-frames form heatsink walls that contact a battery cell therebetween.

* * * * *